United States Patent
Toune

(10) Patent No.: US 9,674,376 B2
(45) Date of Patent: Jun. 6, 2017

(54) MAINTENANCE SYSTEM AND IMAGE FORMATION APPARATUS

(71) Applicant: Oki Data Corporation, Tokyo (JP)

(72) Inventor: Toshio Toune, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/965,971

(22) Filed: Dec. 11, 2015

(65) Prior Publication Data

US 2016/0286055 A1 Sep. 29, 2016

(30) Foreign Application Priority Data

Mar. 24, 2015 (JP) .................. 2015-061133

(51) Int. Cl.
*H04N 1/00* (2006.01)
*H04N 1/44* (2006.01)

(52) U.S. Cl.
CPC ..... *H04N 1/00029* (2013.01); *H04N 1/00005* (2013.01); *H04N 1/00061* (2013.01); *H04N 1/00074* (2013.01); *H04N 1/00344* (2013.01); *H04N 1/00411* (2013.01); *H04N 1/4413* (2013.01); *H04N 2201/0094* (2013.01)

(58) Field of Classification Search
CPC ........... H04N 1/00029; H04N 1/00344; H04N 1/00005; H04N 1/00061; H04N 1/00074; H04N 1/00411; H04N 1/4413; H04N 2201/0094

USPC ........................................................ 358/1.15
See application file for complete search history.

(56) References Cited

U.S. PATENT DOCUMENTS

| | | | | |
|---|---|---|---|---|
| 7,148,979 B1* | 12/2006 | Yanagawa | ........... | G06F 11/0733 358/1.14 |
| 8,826,083 B2* | 9/2014 | Yamasaki | ........... | G06F 11/0733 358/1.14 |
| 9,235,819 B2* | 1/2016 | Torii | ................... | G06F 11/0733 |
| 2007/0069856 A1* | 3/2007 | Lee | ..................... | G06F 11/2221 340/10.1 |
| 2008/0184034 A1* | 7/2008 | Konno | .................. | G06F 21/608 713/183 |
| 2015/0131119 A1* | 5/2015 | Narahashi | .......... | H04N 1/00344 358/1.15 |

FOREIGN PATENT DOCUMENTS

JP          2014-044371 A        3/2014

* cited by examiner

*Primary Examiner* — Allen H Nguyen
(74) *Attorney, Agent, or Firm* — Mots Law, PLLC

(57) ABSTRACT

In a maintenance system, an image formation apparatus forms a diagnosis image on a medium for diagnosing the quality of an image, reads the diagnosis image to create diagnosis image data, and transmits the diagnosis image data to a maintenance apparatus. The maintenance apparatus generates an identification code for identifying the diagnosis image data, and transmits the identification code to the image formation apparatus. The image formation apparatus receives the identification code and notifies a user of the identification code.

15 Claims, 10 Drawing Sheets

(A) DIAGNOSIS PROCEDURES FOR IMAGE FORMATION APPARATUS
(B) MAINTENANCE RECEPTION PROCEDURES FOR MAINTENANCE APPARATUS

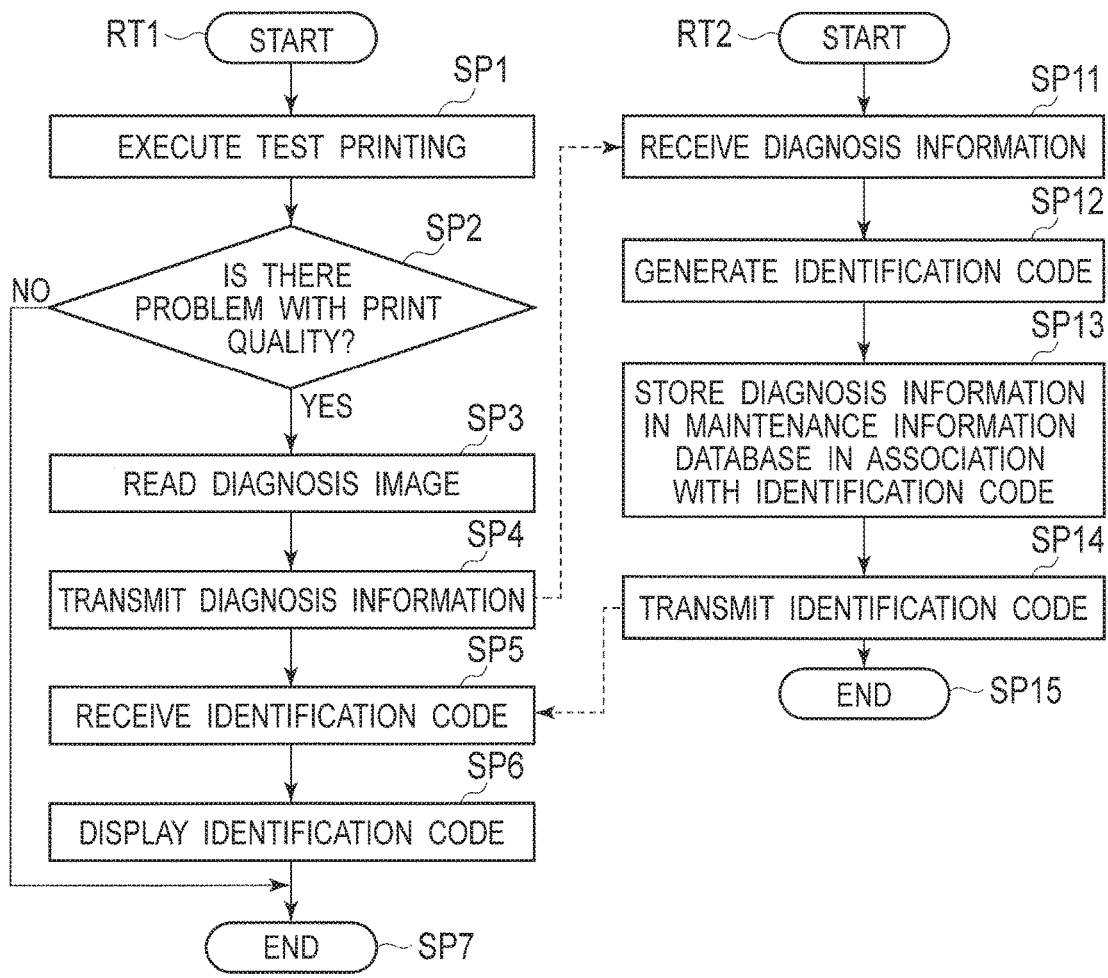

FIG. 3A

```
┌─────────────────────────────────────────────────────────┐ D1
│ DIAGNOSIS OF PROBLEM WITH IMAGE QUALITY : PRINT / FAX PRINT │
├─────────────────────────────────────────────────────────┤
│ EXECUTING TEST PRINT TO CONFIRM EFFECT. PREPARE PAPER FOLLOWING │
│ PROCEDURES. PRESS "NEXT" TO START TEST PRINT WHEN READY. │
├─────────────────────────────────────────────────────────┤
│  1) PREPARE 4 SHEETS OF A4-SIZE OR LETTER-SIZE PLAIN PAPER │
│  2) SET PAPER HORIZONTALLY ON MULTIPURPOSE TRAY         │
│                                                         │
│  (LEAVE PRINT RESULT. YOU MAY NEED TO SCAN AND SEND     │
│   IT AT THE END)                                        │
│                                                         │
│                                                         │
│  [ CANCEL ]                    [◁ BACK ]  [ NEXT ▷]    │
└─────────────────────────────────────────────────────────┘
                                                    B1
```

FIG. 3B

```
┌─────────────────────────────────────────────────────────┐ D2
│ DIAGNOSIS OF PROBLEM WITH IMAGE QUALITY : PRINT / FAX PRINT │
├─────────────────────────────────────────────────────────┤
│ STRIPES, LINES OR STAINS ARE ELIMINATED? SELECT "SOLVED" OR │
│ "NOT SOLVED".                                           │
├─────────────────────────────────────────────────────────┤
│                                                         │
│     [ SOLVED ]          [ NOT SOLVED ]                  │
│                                                         │
│                                                         │
│  [ CANCEL ]                    [◁ BACK ]  [ NEXT ▷]    │
└─────────────────────────────────────────────────────────┘
          B3       B4
```

FIG. 4A

```
DIAGNOSIS OF PROBLEM WITH IMAGE QUALITY : PRINT / FAX PRINT          D3
FOLLOW PROCEDURES TO PREPARE FOR INQUIRY TO CUSTOMER
SUPPORT CONTACT CENTER. PRESS "NEXT" WHEN READY.

SENDING TEST PRINT RESULT AND APPARATUS INFORMATION TO
    CUSTOMER SUPPORT CONTACT CENTER. SCAN AND SEND TEST
    PRINT RESULT.
    1) SET GUIDE OF AUTOMATIC DOUBLE-SIDED DOCUMENT FEEDER
       TO "A4 / A5" OR "LTR" ACCORDING TO PAPER SIZE OF TEST PRINT

[ CANCEL ]            [ ◁  BACK ]         [ NEXT  ▷ ]
                                                   B5
```

FIG. 4B

```
                                                                      D4
   SCANNING TEST PRINT RESULT

SENDING TEST PRINT RESULT

DIAGNOSIS OF PROBLEM WITH IMAGE QUALITY: PRINT / FAX PRINT

NOTIFY CONTACT ON LABEL ON FRONT OF MACHINE OF IDENTIFICATION CODE. PRESS "NEXT" TO END DIAGNOSIS

IDENTIFICATION CODE IS IMPORTANT FOR CUSTOMER IDENTIFICATION. TAKE NOTE OF IDENTIFICATION CODE AND HAVE IT WITH YOU FOR INQUIRY.

IDENTIFICATION CODE : × × × × × × × ×

CONTACT : △△△-△△△-△△△△

PRINT SCREEN (OK) — B6

CANCEL    ◁ BACK    NEXT ▷

| IMAGE DATA a | APPARATUS SPECIFICATION INFORMATION a | ... | IDENTIFICATION CODE a |
|---|---|---|---|
| IMAGE DATA b | APPARATUS SPECIFICATION INFORMATION b | ... | IDENTIFICATION CODE b |
| IMAGE DATA c | APPARATUS SPECIFICATION INFORMATION c | ... | IDENTIFICATION CODE c |
| ⋮ | ⋮ | ⋮ | ⋮ |

```
                                                                    D7
┌─────────────────────────────────────────────────────────────────┐
│ DIAGNOSIS OF PROBLEM WITH IMAGE QUALITY : PRINT / FAX PRINT     │
├─────────────────────────────────────────────────────────────────┤
│ NOTIFY CONTACT ON LABEL ON FRONT OF MACHINE OF                  │
│ IDENTIFICATION CODE. PRESS "NEXT" TO END DIAGNOSIS.             │
├─────────────────────────────────────────────────────────────────┤
│  IDENTIFICATION CODE IS IMPORTANT FOR CUSTOMER IDENTIFICATION.  │
│  TAKE NOTE OF IDENTIFICATION CODE AND HAVE IT WITH YOU FOR INQUIRY │
│                                                                 │
│   DIAGNOSIS DATE OF PROBLEM : IDENTIFICATION CODE               │
│   2014/10/01      :  × × × × × × ×                              │
│   2014/10/10      :  × × × × × × ×                              │
│   2014/11/05      :  × × × × × × ×          ┌────────────────┐  │
│                                             │ PRINT SCREEN(OK)│  │
│  CONTACT : △△△-△△△-△△△△                     └────────────────┘  │
│                                                                 │
├─────────────────────────────────────────────────────────────────┤
│ [ CANCEL ]               [ ◁  BACK ]         [ NEXT  ▷ ]        │
└─────────────────────────────────────────────────────────────────┘
```

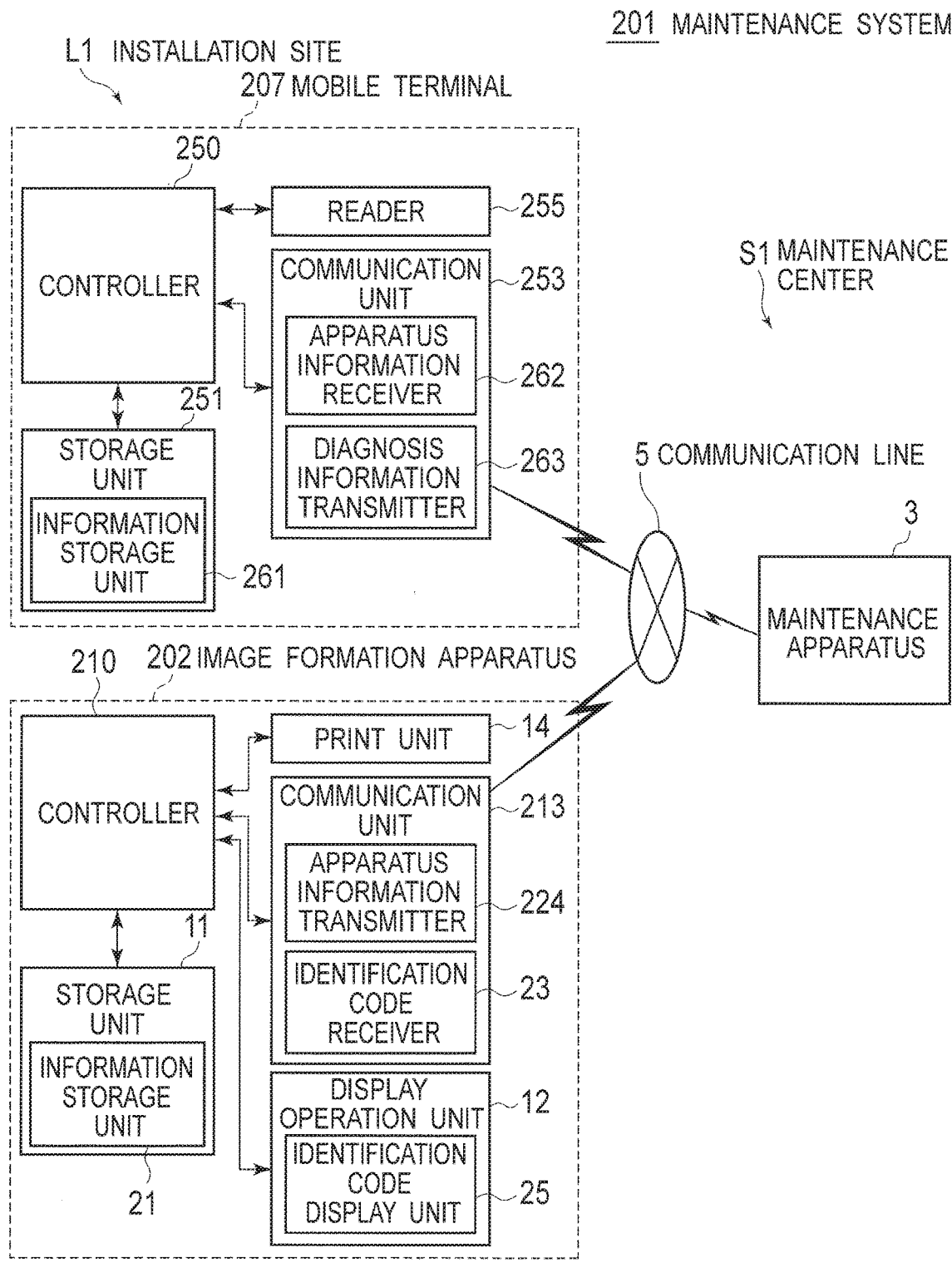

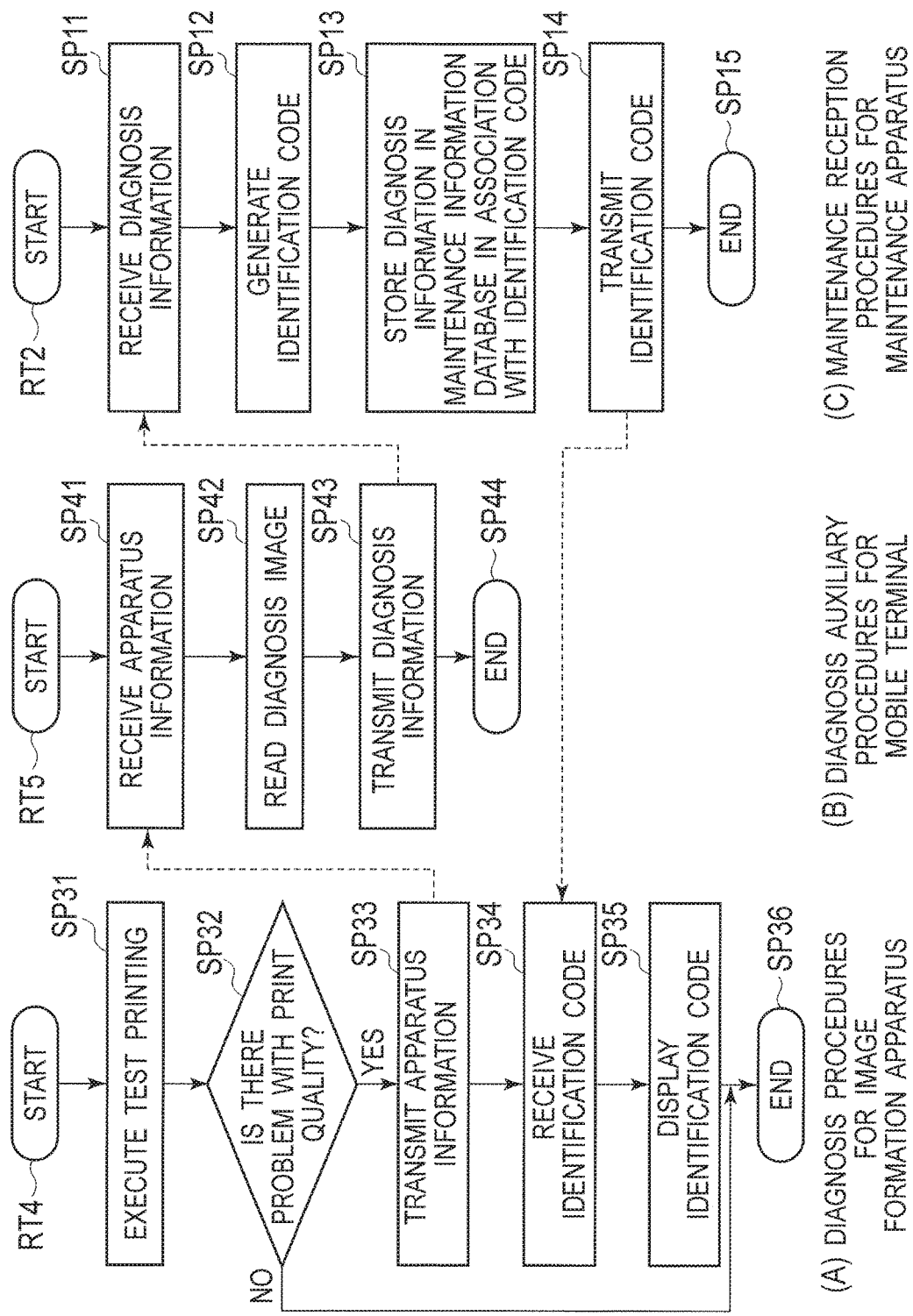

MAINTENANCE SYSTEM AND IMAGE FORMATION APPARATUS

CROSS REFERENCE TO RELATED APPLICATIONS

This application claims priority based on 35 USC 119 from prior Japanese Patent Application No. 2015-061133 filed on Mar. 24, 2015, entitled "MAINTENANCE SYSTEM AND IMAGE FORMATION APPARATUS", the entire contents of which are incorporated herein by reference.

BACKGROUND OF THE INVENTION

1. Field of the Invention

This disclosure relates to a maintenance system and an image formation apparatus, and is suitable for application to a maintenance system for maintaining an image formation apparatus such as a printer, for example.

2. Description of Related Art

Conventional image formation apparatuses have been demanded to print images including characters, graphics and the like desired by a user with good quality on paper as a medium.

Therefore, there have been proposed image formation apparatuses having various measures implemented to prevent the occurrence of a printing failure (for example, see Japanese Patent Application Publication No. 2014-044371 (FIG. 5)).

However, when an image is actually printed on the paper by the image formation apparatus, various factors may lead to the case where a printing result desired by the user cannot necessarily be obtained, i.e., a problem arises. Therefore, manufacturers or distributors of the image formation apparatus may construct a maintenance system for coping with such problems in the image formation apparatus.

SUMMARY OF THE INVENTION

In a maintenance system, for example, an operator having knowledge about an image formation apparatus to be maintained is deployed at a maintenance center to receive a report of a failure of the image formation apparatus from a user over the phone. When determining, based on the received report, that the user can work on his/her own to resolve the failure, the operator can resolve the failure by explaining work to the user and having him/her execute the work.

However, when there is a problem with the state of an image printed on paper, for example, it is difficult for the user to provide an adequate oral explanation of the state of the image over the phone. This may lead to the case where an exact point of the problem is not delivered to the operator. In such a case, a maintenance system sends a maintenance worker with technical knowledge and skills, for example, to the installation site of the image formation apparatus to solve the problem.

However, in this case, the maintenance system sends the maintenance worker even when the work required to solve the problem is so simple that it can be executed by the user on his/her own. This is a problem of the maintenance system since it incurs excessive amounts of time and cost to send the maintenance worker.

It is an object of an embodiment of the invention to propose a maintenance system and an image formation apparatus, capable of having an operator make an appropriate response according to an image formed on a medium by the image formation apparatus.

A first aspect of the invention is a maintenance system that comprises: an image formation apparatus which forms an image on a medium; a maintenance apparatus which manages information about maintenance of the image formation apparatus; and a communication link or line connecting the image formation apparatus to the maintenance apparatus. The image formation apparatus includes an information storage unit configured to store connection information for connecting with the maintenance apparatus through the communication line and apparatus specification information for specifying the image formation apparatus, an image former configured to form, on the medium, a diagnosis image for diagnosing the quality of an image formed, a reader configured to generate diagnosis image data by reading the medium including the diagnosis image formed thereon, and a diagnosis information transmitter configured to be connected with the maintenance apparatus through the communication line based on the connection information stored in the information storage unit, and to transmit the diagnosis image data and the apparatus specification information as diagnosis information to the maintenance apparatus. The maintenance apparatus includes a diagnosis information receiver configured to receive the diagnosis information transmitted from the image formation apparatus through the communication line, an identification code generator configured to generate an identification code for identifying the diagnosis image data and the apparatus specification information received as the diagnosis information, a diagnosis information storage unit configured to store the diagnosis image data and the apparatus specification information received as the diagnosis information as well as the identification code in association with each other, and an identification code transmitter configured to transmit the identification code to the image formation apparatus. The image formation apparatus further includes an identification code receiver configured to receive the identification code from the maintenance apparatus through the communication line, and a notification unit configured to notify a user of the identification code.

A second aspect of the invention is an image formation apparatus which forms an image on a medium and connected to a maintenance apparatus which manages information about maintenance, through a predetermined communication line. The image formation apparatus comprises: an information storage unit configured to store connection information for connecting with the maintenance apparatus through the communication line and apparatus specification information for specifying the image formation apparatus; an image former configured to form, on the medium, a diagnosis image for diagnosing the quality of an image formed; a reader configured to generate diagnosis image data by reading the medium including the diagnosis image formed thereon; a diagnosis information transmitter connected with the maintenance apparatus through the communication line based on the connection information stored in the information storage unit, and configured to transmit the diagnosis image data and the apparatus specification information as diagnosis information to the maintenance apparatus; an identification code receiver configured to receive an identification code, which is generated in association with the diagnosis image data and the apparatus specification information in the maintenance apparatus, from the maintenance apparatus through the communication line; and a notification unit configured to notify the user of the identification code.

According to the above aspects of the invention, the user of the image formation apparatus can allow the operator at the maintenance center where the maintenance apparatus is installed to visually confirm the diagnosis image data just by telling the operator the notified identification code over the phone or the like. Thus, the operator can make a response, such as explaining a solution to a problem to the user or arranging a maintenance worker, after making a technical determination based on the diagnosis image data.

Thus, according to the above aspects of the invention, a maintenance system and an image formation apparatus can be realized, capable of having an operator make an appropriate response according to an image formed on a medium by the image formation apparatus.

BRIEF DESCRIPTION OF THE DRAWINGS

FIG. 2 is a flowchart illustrating a maintenance sequence in the first embodiment.

FIGS. 3A and 3B schematic diagrams illustrating examples of a display screen in the first embodiment.

FIGS. 4A and 4B are schematic diagrams illustrating examples of the display screen in the first embodiment.

FIGS. 5A and 5B are schematic diagrams illustrating examples of the display screen in the first embodiment.

FIG. 9 is a schematic diagram illustrating a display screen in the second embodiment.

FIG. 10 is a block diagram illustrating a configuration of a maintenance system according to a third embodiment.

FIG. 11 is a flowchart illustrating a maintenance sequence in the third embodiment.

DETAILED DESCRIPTION OF EMBODIMENTS

Figure 1:
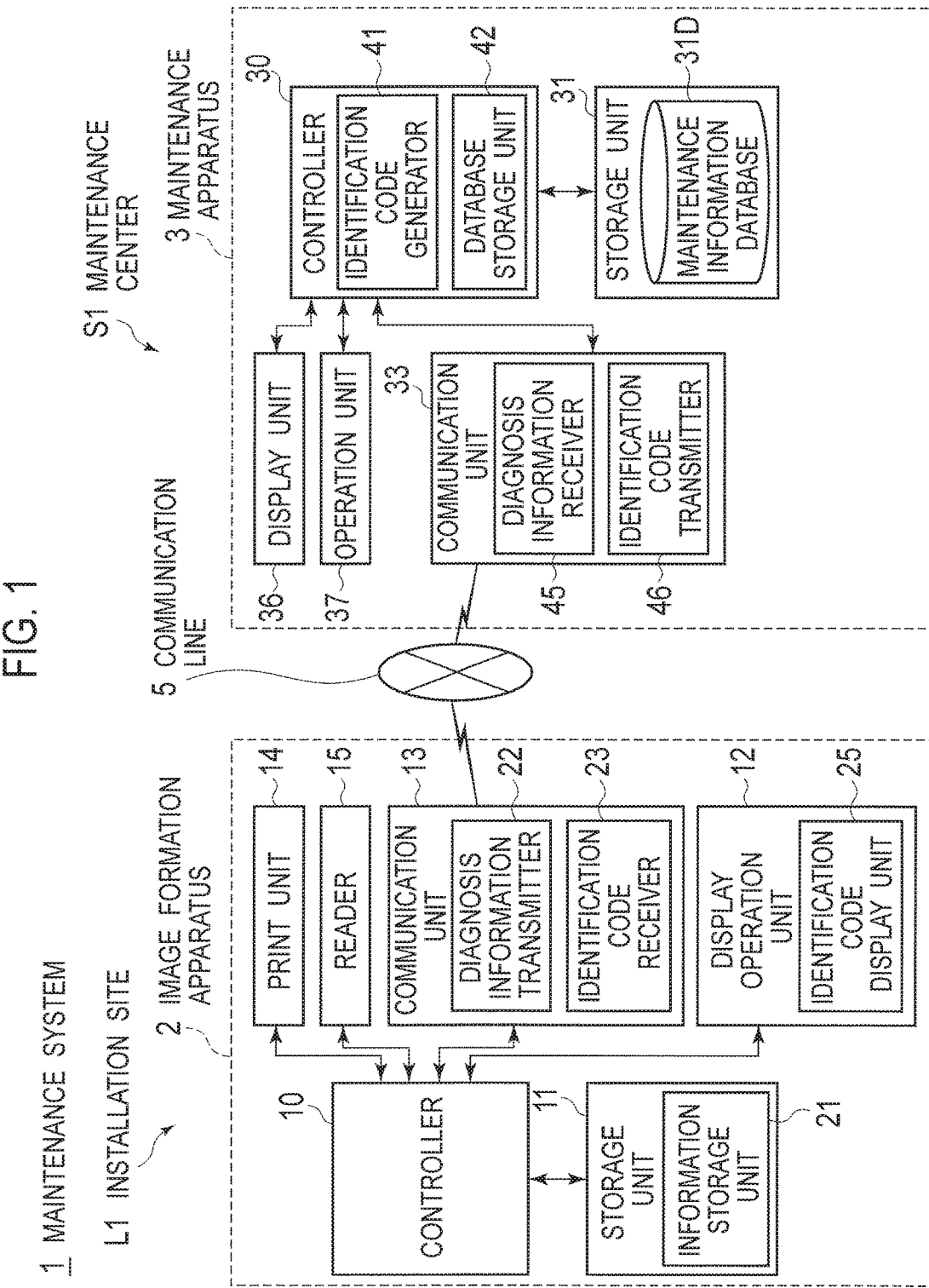
FIG. 1 is a block diagram illustrating a configuration of a maintenance system according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only. Hereinafter, modes for carrying out the invention (hereinafter, referred to as embodiments) are described with reference to the drawings.

[1. First Embodiment]
[1-1. Configuration of Maintenance System]

As illustrated in FIG. 1, maintenance system 1 according to a first embodiment has a configuration in which image formation apparatus 2 and maintenance apparatus 3 are connected to each other through communication line 5, and provides maintenance services for image formation apparatus 2. Image formation apparatus 2 is installed at installation site L1, such as an office or home of a user. Maintenance apparatus 3 is provided at maintenance center S1 away from installation site L1.

At maintenance center S1, an operator who has sufficient knowledge about the image formation apparatus and can operate maintenance apparatus 3 is on standby. Also, at installation site L1 and maintenance center S1, telephone sets are installed, respectively, which can be connected to each other through an unillustrated telephone line. Therefore, the user at installation site L1 and the operator at maintenance center S1 can talk to each other using the each other's telephone sets to connect the telephone lines.

Image formation apparatus 2 is a so-called MFP (Multi Function Printer) with a printer function to form an image on paper as a medium (i.e., to print an image) as well as a function as an image scanner to read the image and a communication function. Image formation apparatus 2 can operate as a printer, a copying machine (copier), a facsimile machine and the like by combining these functions.

Image formation apparatus 2 includes controller 10 to perform an integrated control of the entire apparatus. Controller 10 mainly includes an unillustrated CPU (Central Processing Unit), and performs various kinds of processing such as print processing and diagnosis processing by reading and executing a predetermined program from an unillustrated ROM (Read Only Memory), a flash memory or the like.

Storage unit 11 includes a RAM (Random Access Memory), a hard disk drive and the like, and stores various information such as various setting values required for various kinds of processing such as the print processing and communication processing. Also, storage unit 11 prestores test image data for a test print and a telephone number of maintenance center S1 as contact information indicating a contact for the user to make a phone call to maintenance center S1. Furthermore, in storage unit 11, information storage unit 21 is provided to store address information (e.g., an IP address and a URL (Uniform Resource Locater)) and the like for communicating with maintenance apparatus 3 through communication line 5.

Display operation unit 12 as a notification unit includes an unillustrated touch panel and a combination of physical keys. The touch panel is formed by integrating an LCD (Liquid Crystal Display) that displays a screen for various information and an operation input with a touch sensor for inputting operation instructions and the like from the user. The physical keys include a mode switching key for switching among operation modes (copy, facsimile, printer and the like) of image formation apparatus 2, numeric keys, direction keys, an enter key and the like.

Communication unit 13 is connected to communication line 5 through a wired LAN (Local Area Network) conforming to the standards such as IEEE (Institute of Electrical and Electronics Engineers) 802.3 u/ab, or a wireless LAN conforming to the standards such as IEEE 802.11 a/b/g/n/ac, for example. Communication unit 13 transmits and receives various information and data supplied from controller 10 to or from communication line 5 while performing a predetermined modulation processing, demodulation processing and the like. Moreover, communication unit 13 is also connected to an unillustrated computer device, and receives image data, an instruction to print the image data, and the like and supplies the received image data and instruction to controller 10. Furthermore, communication unit 13 is also connected to an unillustrated telephone network, and can transmit and receive facsimiles.

Print unit 14 as an image former includes an exposure device, a fixing device, a paper feed mechanism (all unillustrated) and the like. Print unit 14 performs printing by feeding the paper, forming a toner image based on the image data supplied from controller 10 and transferring and fixing the toner image on the paper. In this event, print unit 14 can adjust a toner concentration and the like based on the user setting or by performing a predetermined automatic adjustment processing. Moreover, print unit 14 uses built-in sensors and the like to detect a remaining toner level, the presence or absence of paper or a state of each unit, such as the occurrence of a paper jam, and notifies controller 10 of such information.

Reader 15 is configured as a so-called image scanner to read (scan) images on the paper. To be more specific, reader 15 uses an automatic paper feeder, for example, to feed paper to be read (i.e., an original), uses an imaging element to sequentially perform imaging of images formed on the original, generates image data by connecting the obtained imaging data, and supplies the image data to controller 10. Moreover, reader 15 can adjust the sensitivity of the imaging element and the kinds (the number of colors, resolution and the like) of image data to be generated, based on the user setting or by performing a predetermined automatic adjustment processing.

Furthermore, communication unit 13 functions as diagnosis information transmitter 22 and identification code receiver 23 during the diagnosis procedures to be described later. Meanwhile, display operation unit 12 functions as identification code display unit 25 during the diagnosis procedures to be described later.

Maintenance apparatus 3 includes controller 30 to perform an integrated control of the entire apparatus. Controller 30 mainly includes an unillustrated CPU as in the case of controller 10, and performs various kinds of processing, such as maintenance reception processing and communication processing, by reading and executing a predetermined program from an unillustrated ROM, a flash memory or the like. Storage unit 31 includes a RAM, a hard disk drive and the like, as in the case of storage unit 11, and stores various information such as maintenance information database 31D to be described later.

As in the case of communication unit 13, communication unit 33 is connected to communication line 5 through a wired LAN conforming to the standards such as IEEE 802.3 ab. Communication unit 33 supplies various information and data received through communication line 5 to controller 30 and transmits various information and data supplied from controller 30 to communication line 5 while performing a predetermined modulation processing, demodulation processing and the like. Furthermore, maintenance apparatus 3 also includes: display unit 36 including a display and the like to display information such as images and characters to the operator at maintenance center S1; and operation unit 37 including a keyboard, a mouse and the like to receive operation instructions from the operator.

[1-2. Maintenance Sequence]

Next, with reference to the two flowcharts illustrated in FIG. 2, a description is given of the maintenance sequence for performing a maintenance service in maintenance system 1. The user who uses image formation apparatus 2 at installation site L1 executes the diagnosis processing by performing a predetermined operation to display operation unit 12 in the case where a desired printing result cannot be obtained when print processing is performed by image formation apparatus 2, such as where an image formed on paper is stained, blurred or unclear, for example.

To be more specific, controller 10 in image formation apparatus 2 starts diagnosis procedures RT1 illustrated in FIG. 2 and moves to step SP1. Controller 10 carries out a test printing in step SP1 and then moves to the next step SP2. In this event, controller 10 first allows the user to perform a paper preparation and the like by displaying display screen D1, illustrated in FIG. 3A, on display operation unit 12. Display screen D1 is configured as a GUI (Graphical User Interface), which displays messages indicating explanation and instructions to the user, operation buttons to receive operation instructions, and the like.

Subsequently, when button B1 showing "Next" on display screen D1 is pressed, controller 10 reads test image data prestored in storage unit 11 and supplies the read test image data to print unit 14, thereby printing a test image on the paper. Hereinafter, the paper having the test image printed thereon is called test print paper, and the test image printed on the test print paper is called a diagnosis image.

In step SP2, controller 10 determines whether or not there is a problem with the print quality pointed out by the user. To be more specific, controller 10 displays display screen D2, as illustrated in FIG. 3B, on display operation unit 12, thereby allowing the user to visually confirm the diagnosis image on the test print paper and then to press either of solved button B3 showing "Solved" or unsolved button B4 showing "Unsolved".

If a positive result (YES) is obtained in step SP2, i.e., unsolved button B4 on display screen D2 is pressed by the user, the user is not satisfied with the test print result and sees that there is a problem with the print quality. In this event, controller 10 moves to the next step SP3.

In step SP3, controller 10 reads the test print paper by using reader 15 and then moves to the next step SP4. To be more specific, controller 10 displays display screen D3, illustrated in FIG. 4A, to allow the user to set the test print paper on reader 15. Subsequently, when button B5 showing "Next" on display screen D3 is pressed, controller 10 displays display screen D4, illustrated in FIG. 4B, on display operation unit 12, and generates diagnosis image data by using reader 15 to read the diagnosis image from the test print paper, and temporarily stores the generated diagnosis image data in storage unit 11. In this event, controller 10 generates the diagnosis image by setting values set for the brightness, resolution and the like of the image in reader 15 to diagnosis image setting values suitable for the generation of the diagnosis image.

In step SP4, controller 10 notifies the user of the current operation state by displaying display screen D5, illustrated in FIG. 5A, on display operation unit 12. At the same time, controller 10 reads address information and the like of maintenance apparatus 3 from information storage unit 21 and allows communication unit 13 to function as diagnosis information transmitter 22 to transmit diagnosis information to maintenance apparatus 3 through communication line 5, and then moves to the next step SP5.

Here, the diagnosis information includes diagnosis image data and apparatus information. The diagnosis image data is image data generated in step SP3 and temporarily stored in storage unit 11. The apparatus information further includes apparatus specification information, setting information and state information. Among such information, the apparatus specification information is a number for specifying image formation apparatus 2, such as a serial number and a user registration number, for example, which is prestored in storage unit 11. The setting information is information indicating setting values for forming an image in image formation apparatus 2, such as a setting value for print concentration, for example, and is stored in storage unit 11. The state information is information indicating a state of each unit in image formation apparatus 2, such as a remaining toner level, life of a drum and the number of paper to be printed, for example, and is information to be generated based on values acquired by controller 10 from a sensor and the like in each unit.

Meanwhile, controller 30 in maintenance apparatus 3 (FIG. 1) starts maintenance reception procedures RT2, and in step SP11, receives the diagnosis information transmitted from image formation apparatus 2 through communication line 5 by allowing communication unit 33 to function as diagnosis information receiver 45. After temporarily storing the diagnosis information in the RAM or the like of storage unit 31, controller 30 moves to the next step SP12.

In step SP12, controller 30 functions as identification code generator 41 to generate an identification code. Then, controller 30 moves to the next step SP13. The identification code generated in this event includes, for example, about 10 to 16 digits of alphanumeric characters, and is different from other identification codes already generated and thus uniquely identifiable.

Figures 6, 7:
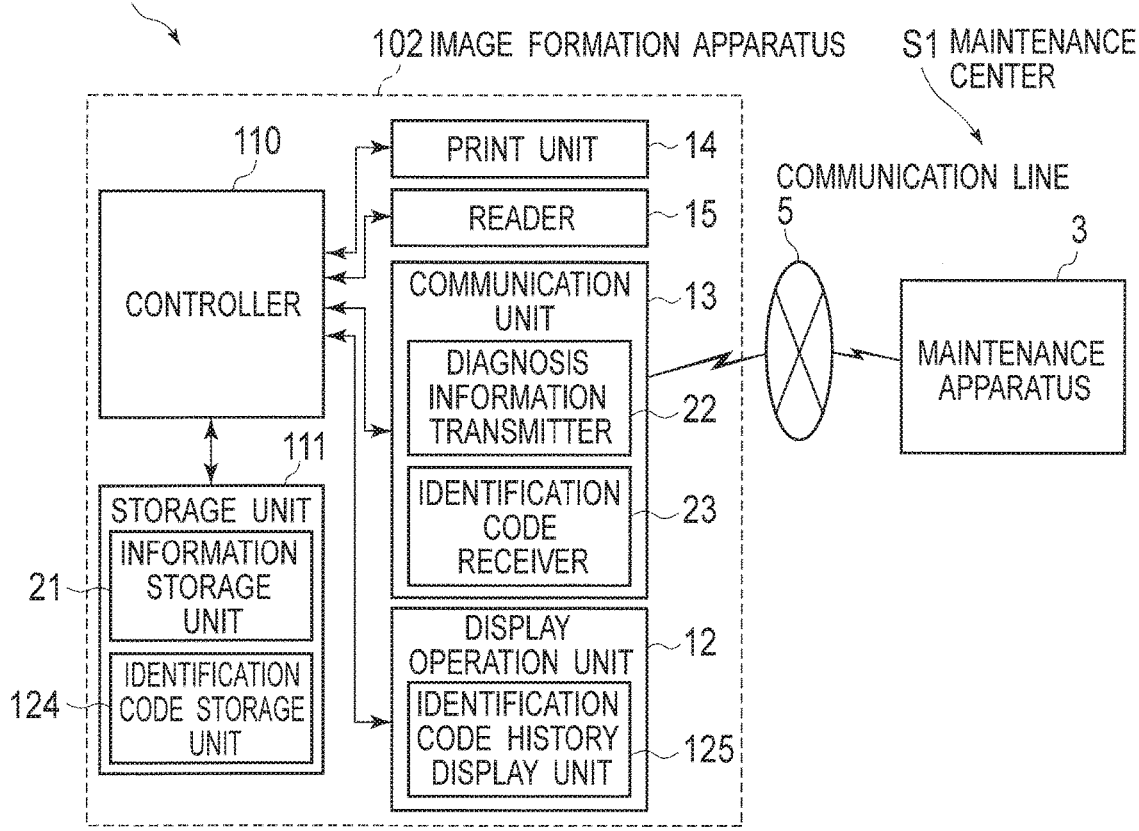
FIG. 6 is a schematic diagram illustrating a configuration of a maintenance information database.
FIG. 7 is a block diagram illustrating a configuration of a maintenance system according to a second embodiment.

In step SP13, controller 30 functions as database storage unit 42 to store the diagnosis information received in step SP11 and the identification code generated in step SP12 in maintenance information database 31D of storage unit 31 while associating the diagnosis information and the identification code with each other. Then, controller 30 moves to the next step SP14. Here, in maintenance information database 31D, diagnosis image data included in the diagnosis information, various information (e.g., the apparatus specification information and the like) included in the apparatus information, and the identification code are stored in association with each other as one piece of maintenance information (i.e., information for one row in FIG. 6) as illustrated in FIG. 6.

In step SP14, controller 30 transmits the identification code generated in step SP12 to image formation apparatus 2 through communication line 5 by allowing communication unit 33 to function as identification code transmitter 46. Thereafter, controller 30 moves to the next step SP15 to terminate maintenance reception procedures RT2.

Accordingly, controller 10 in image formation apparatus 2 moves to step SP5 in diagnosis procedures RT1 to receive the identification code through communication line 5 by allowing communication unit 13 to function as identification code receiver 23. Then, controller 10 moves to the next step SP6. In step SP6, controller 10 notifies the user of the identification code by allowing display operation unit 12 to function as identification code display unit 25, thereby displaying display screen D6 illustrated in FIG. 5B.

On display screen D6, the telephone number of maintenance center S1 read from storage unit 11 (FIG. 1) is displayed as a contact, in addition to the identification code received in step SP5. Display screen D6 also displays print button B6 for printing the contents on display screen D6, i.e., the identification code, the contact and the like on the paper. Thereafter, controller 10 moves to the next step SP7 to terminate diagnosis procedures RT1.

In this event, when visually confirming display screen D6, the user makes a note of the identification code and contact displayed on display operation unit 12 or prints the identification code and contact on the paper by pressing print button B6. Thereafter, the user makes a phone call to the contact displayed on display screen D6, talks to the operator at maintenance center S1 to describe the problem, and orally delivers the identification code to the operator.

The operator operates operation unit 37 in maintenance apparatus 3 (FIG. 1) to read the image data associated with the identification code in maintenance information database 31D (i.e., the diagnosis image data) and to display the read image data on display unit 36 or print the image data on the paper by using an image formation apparatus (not illustrated) installed at maintenance center S1. Subsequently, the operator visually recognizes the occurrence of the problem by referring to the diagnosis image data displayed on display unit 36 or the diagnosis image data printed on the paper. Then, the operator makes a response, such as explaining a solution to the problem to the user or arranging for a maintenance worker, by making a determination based on the operator's technical knowledge.

On the other hand, if a negative result (NO) is obtained in step SP2, i.e., solved button B3 on display screen D2 is pressed by the user, the user is satisfied with the test print result and sees that there is no problem with the print quality. In this event, controller 10 moves to the next step SP7 to terminate diagnosis procedures RT1.

[1-3. Operations and Effects]

In maintenance system 1 thus configured according to the first embodiment, when the diagnosis processing is performed based on a user operation in image formation apparatus 2, the test printing is carried out to print a test image data on the paper and the user visually confirms the printed diagnosis image. When the user determines, after visually confirming the diagnosis image, that the problem is not solved, image formation apparatus 2 generates diagnosis image data by using the reader 15 to read the test print paper and transmits the generated diagnosis image data to maintenance apparatus 3 together with the apparatus information as diagnosis information.

Upon receipt of the diagnosis information, maintenance apparatus 3 generates a unique identification code. Also, maintenance apparatus 3 stores the identification code in maintenance information database 31D in association with the diagnosis image data and the like included in the diagnosis information, and transmits the identification code to image formation apparatus 2. Image formation apparatus 2 notifies the user of the received identification code by displaying the identification code on display operation unit 12. In response, the user talks to the operator at maintenance center S1 over the phone and orally delivers the identification code, thereby allowing the operator to visually confirm the diagnosis image data and visually recognize the situation of the problem.

As described above, in maintenance system 1, the test print paper is read in image formation apparatus 2, the diagnosis image data is generated and transmitted to maintenance apparatus 3, a unique identification code is generated and associated with the diagnosis image data in maintenance apparatus 3, and the identification code is transmitted to image formation apparatus 2 and notified to the user.

Therefore, in maintenance system 1, the user can allow the operator to visually confirm the diagnosis image data just by orally delivering the identification code to the operator over the phone. More specifically, in maintenance system 1, the user does not need to orally explain the state of the diagnosis image that is the result of the test printing. The operator who is experienced in problems with image formation apparatus 2 can make an appropriate response based on the technical knowledge about the problems by visually confirming the diagnosis image data and correctly recognizing the situations of the problems.

Namely, maintenance system 1 can solve a problem that the operator cannot properly understand the situation of the problem in image formation apparatus 2 only through the explanation by the user over the phone. Thus, maintenance system 1 can avoid unnecessary consumption of time and cost, such as when a maintenance worker is sent to installation site L1 for a problem that can be solved by a simple user operation, for example.

Moreover, in image formation apparatus 2, test image data which is suitable for making a determination of the problem and is prestored in storage unit 11 is printed on the paper as test printing, thereby forming a diagnosis image on the paper. Thus, image formation apparatus 2 can allow the user to easily determine whether or not there is a problem, based on the diagnosis image. Moreover, image formation apparatus 2 can allow the operator to properly understand the situation of the problem, based on the diagnosis image data generated by reading the diagnosis image.

Furthermore, when generating the diagnosis image data by reading the diagnosis image on the test print paper using the reader 15, image formation apparatus 2 sets various setting values in reader 15 to preset the diagnosis image setting values. Thus, image formation apparatus 2 can generate the diagnosis image data having a brightness, resolution and the like properly adjusted, and can allow the operator to properly determine the situation of the problem based on the diagnosis image data.

Moreover, during the execution of the diagnosis processing, image formation apparatus 2 requires some operations to be performed by the user, such as preparing the paper and setting the test print paper on reader 15. In this regard, image formation apparatus 2 can notify the user of the progress of the diagnosis processing and the operations to be performed by the user in an easy-to-understand manner at the right timing by sequentially displaying display screen D1 (FIG. 3A) and the like on display operation unit 12.

Furthermore, when executing the diagnosis processing, image formation apparatus 2 can generate diagnosis image data and transmit the data to maintenance apparatus 3 and also receive and display the identification code from maintenance apparatus 3, by following diagnosis procedures RT1 (FIGS. 3A and 3B). Thus, in the diagnosis processing, image formation apparatus 2 only needs to execute relatively easy operations within a minimum necessary range, such as having the user prepare the paper and reader 15 read the test print result.

In maintenance system 1 according to the first embodiment thus configured, image formation apparatus 2 performs test printing, generates diagnosis image data by reading the test print paper and transmits the diagnosis image data to maintenance apparatus 3, while maintenance apparatus 3 generates a unique identification code in association with the diagnosis image data and notifies the user of the identification code by transmitting the identification code to image formation apparatus 2. Therefore, in maintenance system 1, the user can allow the operator who is experienced in problems with image formation apparatus 2 to make an appropriate response to the problem by visually confirming the diagnosis image data and correctly recognizing the situation of the problem, just by orally delivering the identification code to the operator over the phone.

[2. Second Embodiment]

As illustrated in FIG. 7 corresponding to FIG. 1, maintenance system 101 according to a second embodiment is different from maintenance system 1 according to the first embodiment by including image formation apparatus 102 instead of image formation apparatus 2. Other than that, maintenance system 101 has the same configuration as that of maintenance system 1. Image formation apparatus 102 is different from image formation apparatus 2 by including controller 110 and storage unit 111 instead of controller 10 and storage unit 11. Other than that, image formation apparatus 102 has the same configuration as that of image formation apparatus 2.

Controller 110 mainly includes an unillustrated CPU as in the case of controller 10, and performs various kinds of processing such as print processing and diagnosis processing by reading and executing a predetermined program from an unillustrated ROM, a flash memory or the like. However, as described later, the diagnosis processing is partially different from that in the first embodiment. Storage unit 111 includes a RAM, a hard disk drive and the like and stores various kinds of information as in the case of storage unit 11. Storage unit 111 also includes identification code storage unit 124 configured to store previous identification codes, in addition to the same information storage unit 21 as that in the first embodiment.

Figure 8:
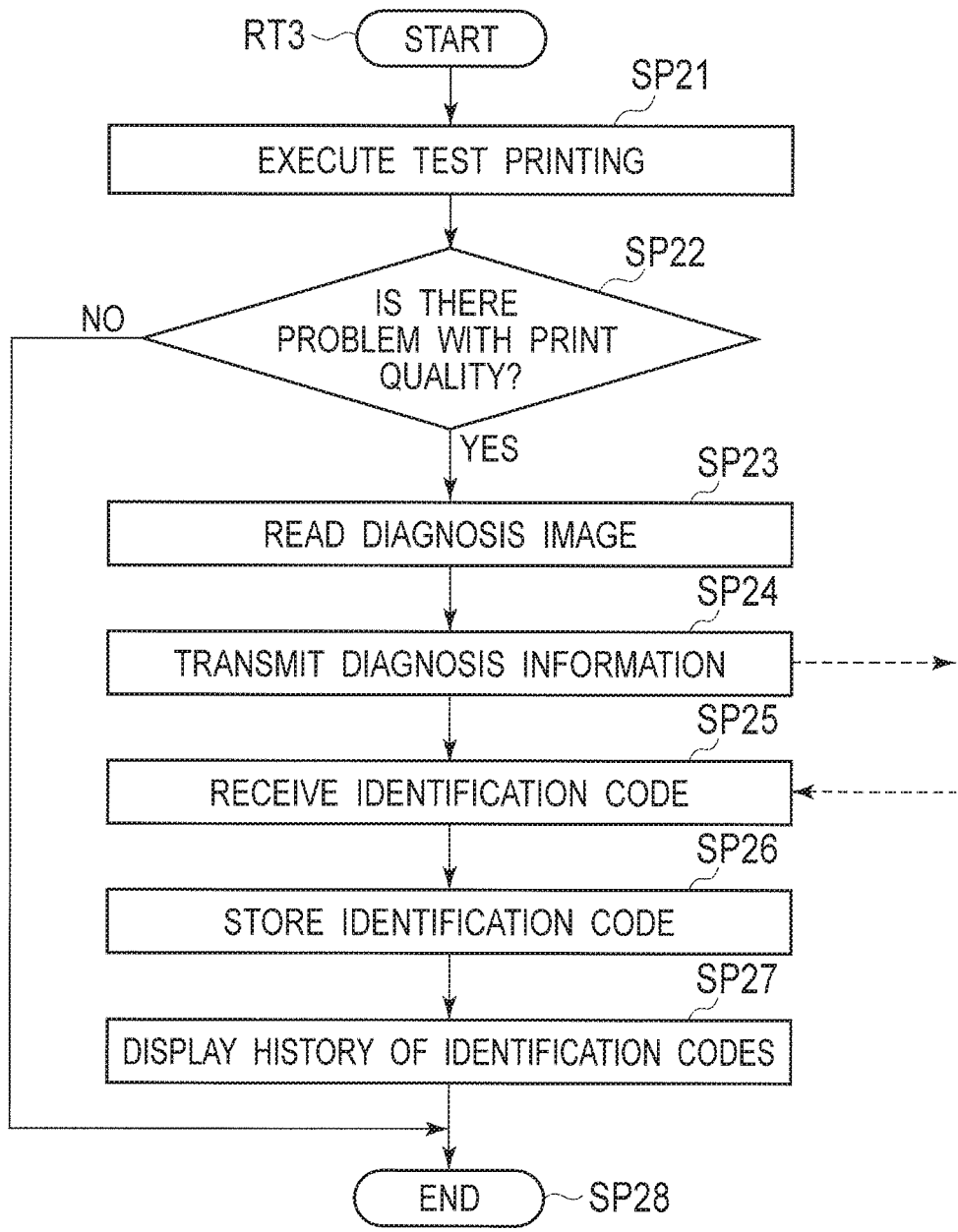
FIG. 8 is a flowchart illustrating diagnosis procedures for an image formation apparatus in the second embodiment.

When a maintenance service is performed in maintenance system 101, controller 110 in image formation apparatus 102 executes diagnosis procedures RT3 illustrated in FIG. 8, instead of diagnosis procedures RT1 (FIG. 2). To be more specific, controller 110 receives an identification code from maintenance apparatus 3 by performing the same processing as steps SP1 to SP5 in steps SP21 to SP25, and then moves to the next step SP26.

In step SP26, controller 110 stores the received identification code in identification code storage unit 124 in storage unit 111 in association with the date of the receipt. Then, controller 110 moves to the next step SP27. In step SP27, controller 110 first reads three identification codes in chronological order, most recent first, among those stored in identification code storage unit 124. Then, controller 110 allows display operation unit 12 to function as identification code history display unit 125, thereby displaying display screen D7 illustrated in FIG. 9 corresponding to FIG. 6B and notifying the user of the identification codes. Thereafter, controller 110 moves to the next step SP28 to terminate diagnosis procedures RT3.

In this event, when visually confirming display screen D7, as in the case of the first embodiment, the user makes a phone call to the displayed contact, talks to the operator at maintenance center S1 to describe a problem, and orally delivers the identification codes to the operator. In response, the operator visually recognizes the occurrences of the current and previous problems by referring to the diagnosis image data associated with the respective identification codes. Then, the operator gives a response, such as explaining a solution to the problem to the user or arranging to send a maintenance worker.

As described above, in maintenance system 101 according to the second embodiment, the identification code transmitted from maintenance apparatus 3 is stored in identification code storage unit 124 in image formation apparatus 102, and the previous identification codes are displayed on display operation unit 12 (FIG. 9) together with the date and time of the receipt thereof.

Thus, in maintenance system 101, as in the case of the first embodiment, the user can allow the operator to visually confirm the diagnosis image data just by orally delivering the identification code to the operator over the phone. Moreover, in maintenance system 101, the user can also allow the operator to visually confirm the previous diagnosis image data by also delivering the identification codes received in the past. Thus, in maintenance system 101, the operator can make an appropriate response considering the previous problems by correctly recognizing the situations of the problems in image formation apparatus 102 together with the situations of the previous problems.

As for the other points, maintenance system 101 can achieve the same advantageous effects as those achieved by maintenance system 1 according to the first embodiment.

In maintenance system 101 according to the second embodiment thus configured, image formation apparatus 102 performs test printing, generates diagnosis image data by reading the test print paper and transmits the diagnosis image data to maintenance apparatus 3, while maintenance apparatus 3 generates a unique identification code in association with the diagnosis image data and notifies the user of the identification code together with the identification code received in the past by transmitting the identification code to image formation apparatus 102. Therefore, in maintenance system 101, the user can allow the operator experienced in problems with image formation apparatus 2 to make an appropriate response to the problem by visually confirming the latest and previous diagnosis image data and correctly recognizing the situation of the problem, just by orally delivering the identification codes to the operator over the phone.

[3. Third Embodiment]

As illustrated in FIG. 10 corresponding to FIG. 1, maintenance system 201 according to a third embodiment is different from maintenance system 1 according to the first embodiment by including image formation apparatus 202 instead of image formation apparatus 2 and further including a mobile terminal 207. Other than that, maintenance system 201 has the same configuration as that of maintenance system 1.

Image formation apparatus 202 is different from image formation apparatus 2 by omitting reader 15 and including controller 210 and communication unit 213 instead of controller 10 and communication unit 13. Other than that, image formation apparatus 202 has the same configuration as that of image formation apparatus 2. Namely, image formation apparatus 202 is configured as a so-called printer.

Controller 210 mainly includes an unillustrated CPU as in the case of controller 10, and performs various kinds of processing such as print processing and diagnosis processing by reading and executing a predetermined program from an unillustrated ROM, a flash memory or the like. However, as described later, the diagnosis processing is partially different from that in the first embodiment.

Communication unit 213 is different from communication unit 13 by omitting diagnosis information transmitter 22 and including apparatus information transmitter 224 instead. Apparatus information transmitter 224 transmits apparatus information on image formation apparatus 202 through communication line 5.

Mobile terminal 207 is a cell-phone, a smartphone or a tablet computer device, for example, and is held by a user of image formation apparatus 202. Mobile terminal 207 includes controller 250, storage unit 251, communication unit 253 and reader 255.

Controller 250 mainly includes an unillustrated CPU as in the case of controller 210 in image formation apparatus 202, and performs various kinds of processing, such as communication processing, by reading and executing a predetermined program from an unillustrated ROM or the like. Storage unit 251 includes a RAM, a flash memory or the like and stores various information. Storage unit 251 also stores address information and the like for communicating with maintenance apparatus 3 through communication line 5 in information storage unit 261.

Communication unit 253 is connected to communication line 5 through a wireless LAN conforming to the standards such as IEEE 802.11 a/b/g/n/ac, for example. Communication unit 253 transmits and receives various information while performing a predetermined modulation processing, demodulation processing and the like. Communication unit 253 includes apparatus information receiver 262 in addition to diagnosis information transmitter 263 having the same configuration as that of diagnosis information transmitter 22 in image formation apparatus 2 (FIG. 1). Apparatus information receiver 262 receives apparatus information to be transmitted from image formation apparatus 202 through communication line 5.

Reader 255 is a so-called camera, which generates image data based on light entering through a lens. Reader 255 can generate image data similar to that when an original is read by an image scanner, by performing imaging in a state where reader 255 faces the printed paper and an imaging range is adjusted so as to cover the entire paper (i.e., in a state where the position of mobile terminal 207 is adjusted), for example.

In maintenance system 201, a maintenance service for image formation apparatus 202 is performed according to a maintenance sequence illustrated in FIG. 11 corresponding to FIG. 2. To be more specific, controller 210 in image formation apparatus 202 starts diagnosis procedures RT4 and moves to step SP31. Controller 210 performs the same processing as steps SP1 and SP2 in steps SP31 and SP32, and moves to the next step SP33 when a positive result is obtained in step SP32.

In step SP33, controller 210 reads apparatus information from information storage unit 21 in storage unit 11, and apparatus information transmitter 224 in communication unit 213 transmits the apparatus information to mobile terminal 207 through communication line 5.

Meanwhile, controller 250 in mobile terminal 207 (FIG. 10) starts diagnosis auxiliary procedures RT5 according to a user operation and the like, receives the apparatus information from image formation apparatus 202 in step SP41, and moves to the next step SP42. In step SP42, controller 250 generates diagnosis image data by using reader 255 to read a diagnosis image from the test print paper, and moves to the next step SP43 after temporarily storing the generated diagnosis image data in storage unit 251.

In step SP43, controller 250 reads address information and the like on maintenance apparatus 3 from information storage unit 261, and transmits the diagnosis information to maintenance apparatus 3 through communication line 5 by allowing communication unit 253 to function as diagnosis information transmitter 263. Thereafter, controller 250 moves to the next step SP44 to terminate diagnosis auxiliary procedures RT5. The diagnosis information to be transmitted here includes the apparatus information acquired from image formation apparatus 202 and the diagnosis image data generated by reader 255.

Meanwhile, controller 30 in maintenance apparatus 3 (FIG. 1) starts maintenance reception procedures RT2 as in the case of the first embodiment, receives diagnosis information in steps SP11 to SP13, generates an identification code, and stores both in a maintenance information database. Furthermore, after transmitting the identification code to image formation apparatus 202 in step SP14, controller 30 moves to step SP15 to terminate maintenance reception procedures RT2.

In response, controller 210 in image formation apparatus 202 receives the identification code in step SP34 as in the case of step SP5 (FIG. 2), and displays the identification code on display operation unit 12 in step SP35 as in the case of step SP6. Thereafter, controller 210 moves to the next step SP36 to terminate diagnosis procedures RT4.

As described above, in maintenance system 201 according to the third embodiment, diagnosis image data is generated by using reader 255 in mobile terminal 207 to read the test print paper printed by image formation apparatus 202 having no reader, and the generated diagnosis image data is transmitted to maintenance apparatus 3. More specifically, in maintenance system 201, even though image formation apparatus 202 cannot generate diagnosis image data on its own, the diagnosis image data can be generated by using reader 255 (i.e., camera) in mobile terminal 207 held by the user.

Accordingly, in maintenance system 201, as in the case of the first embodiment, the diagnosis image data can be stored in maintenance information database 31D in maintenance apparatus 3 (FIG. 1), and image formation apparatus 202 can receive the identification code associated with the diagnosis image data and present the identification code to the user. Thus, in maintenance system 201, as in the case of the first embodiment, the user can allow the operator to visually confirm the diagnosis image data just by orally delivering the identification code to the operator over the phone.

As for the other points, maintenance system 201 can achieve the same advantageous effects as those achieved in the first embodiment, except for the part related to the reader.

In maintenance system 201 according to the third embodiment thus configured, image formation apparatus 202 performs test printing, generates diagnosis image data by reading the test print paper with mobile terminal 207 and transmits the diagnosis image data to maintenance apparatus 3. Meanwhile, maintenance apparatus 3 generates a unique identification code in association with the diagnosis image data and notifies the user of the identification code by transmitting the identification code to image formation apparatus 202. Therefore, in maintenance system 201, the user can allow the operator who is experienced in problems with image formation apparatus 202 to make an appropriate response to the problem by visually confirming the diagnosis image data and correctly recognizing the situation of the problem, just by orally delivering the identification codes to the operator over the phone.

[4. Other Embodiments]

Note that, in the first embodiment, the description is given of the case where the identification code is notified to the user by displaying the identification code on display screen D6 displayed on display operation unit 12 in image formation apparatus 2 (FIG. 5B). However, the invention is not limited thereto but, for example, the identification code may be notified to the user by using various other methods such as a method of unconditionally printing an identification code on paper or a method of sending an e-mail to a pre-registered user's mail address.

Moreover, in the second embodiment, the description is given of the case where, upon receipt of the identification code by image formation apparatus 102, the identification code is stored in association with the date of the receipt thereof in identification code storage unit 124. However, the invention is not limited thereto but, for example, upon receipt of the identification code by image formation apparatus 102, the identification code may be stored in association with the date and time of the receipt thereof in identification code storage unit 124 and displayed together with the date and time on display screen D7 (FIG. 9). Alternatively, only the identification codes may be displayed without displaying the date, time and the like. Furthermore, diagnosis image data may also be stored in association with the received identification code, and the previous diagnosis image data may be displayed on display operation unit 12 according to a user operation.

Furthermore, in the first embodiment, the description is given of the case where the telephone number of maintenance center S1 is prestored in storage unit 11 and the telephone number of maintenance center S1 is displayed as a contact on display screen D6 displayed on display operation unit 12 in image formation apparatus 2 (FIG. 5B). However, the invention is not limited thereto but, for example, the latest contact may be received together with the identification code from maintenance apparatus 3 and the received latest contact may be displayed on display screen D6. Also, in this case, the contact is not limited to the telephone number but, for example, various information related to the contact, such as the name of the operator in charge, the hours during which calls can be received and a website URL, may be displayed. Alternatively, no contacts may be displayed on display screen D6. This also holds true for the second and third embodiments.

Furthermore, in the first embodiment, the description is given of the case where display screen D6 configured as the GUI is displayed on display operation unit 12 including the touch panel (FIG. 9) and print button B6 is provided within display screen D6. However, the invention is not limited thereto but, for example, display operation unit 12 may be configured as a simple combination of a display panel and operation buttons and a message "Press "#" key to print this page" may be displayed on the display panel instead of print button B6. In this case, when "#" key is pressed among the operation buttons, the contents of display screen D6 may be printed on the paper as in the case where print button B6 is pressed. Alternatively, print button B6 may be omitted from display screen D6. This also holds true for the second embodiment.

Furthermore, in the first embodiment, the description is given of the case where image formation apparatus 2 transmits the apparatus specification information, the setting information and the state information as the apparatus information to maintenance apparatus 3. However, the invention is not limited thereto but, for example, at least one of the setting information and the state information may be omitted. Moreover, various setting values or state values in image formation apparatus 2 can be appropriately adopted as the setting information and the state information. The point is that at least the apparatus specification information need only be included as the apparatus information. This also holds true for the second and third embodiments.

Furthermore, in the first embodiment, the description is given of the case where the identification code uniquely includes about 10 to 16 digits of alphanumeric characters. However, the invention is not limited thereto but, for example, a part of the identification code may be a character string for specifying image formation apparatus 2 or the user, a character string representing the date and time, or the like. For example, the identification code may be divided into a first half and a second half, and the first half may be set as the serial number of image formation apparatus 2 or the user number assigned to the user, while the second half may include unique alphanumeric characters. Thus, image formation apparatus 2 or the user can be specified once the operator hears the identification code from the user. Alternatively, a part of the identification code may include a character string representing the date and time. Thus, the date and time of occurrence of a problem can be roughly known once the operator hears the identification code. This also holds true for the second and third embodiments.

Furthermore, in the first embodiment, the description is given of the case where, during execution of diagnosis procedures RT1 by controller 10 in image formation apparatus 2 (FIG. 2), test printing is executed unconditionally in the first step SP1. However, the invention is not limited thereto but, for example, before execution of the test printing, a possible cause of a problem may be displayed on display operation unit 12 based on various setting values or state values obtained from the respective units by controller 10, and the user takes predetermined measures based thereon. Then, only when the problem is still not solved, the processing of step SP1 and subsequent steps may be performed. This also holds true for the second and third embodiments.

Furthermore, in the first embodiment, the description is given of the case where, during execution of diagnosis procedures RT1 by controller 10 in image formation apparatus 2 (FIG. 2), display screens such as display screen D1 (FIG. 3A) to display screen D6 (FIG. 5B) are displayed on display operation unit 12. However, the invention is not limited thereto but, for example, various display screens may be displayed, such as a display screen for requesting the user to confirm the execution of the processing, a display screen for notifying the execution of the processing and a display screen for displaying details about the progress of the processing. The point is that the diagnosis processing may be carried out while presenting various information to the user on the display screen and confirming the intentions of the user. This also holds true for the second embodiment.

Furthermore, in the first embodiment, the description is given of the case where, after the execution of diagnosis procedures RT1 by controller 10 in image formation apparatus 2 (FIG. 2), the user makes a phone call to maintenance center S1 to orally deliver the identification code to the operator, and thus the operator explains a way of coping with the problem, or arranges for a maintenance worker or the like, after visually confirming the diagnosis image data. However, the invention is not limited thereto but, for example, when the operator operates maintenance apparatus 3 and confirms the newly registered maintenance information, rather than the user making a phone call to the operator, the operator may send an e-mail containing a report on the way of coping or for making arrangement of the maintenance worker, after visually confirming the diagnosis image data.

Furthermore, in the third embodiment, the description is given of the case where maintenance apparatus 3 transmits the identification code to image formation apparatus 202, thereby displaying the identification code on display operation unit 12 (FIG. 10). However, the invention is not limited thereto but, for example, when mobile terminal 207 has a display operation unit including a touch panel, maintenance apparatus 3 may transmit the identification code to mobile terminal 207, thereby displaying the identification code on the display operation unit in mobile terminal 207.

Furthermore, in the third embodiment, the description is given of the case where mobile terminal 207, such as a smartphone, is used to generate diagnosis image data by reading a diagnosis image from test print paper and to transmit the diagnosis image data to maintenance apparatus 3 together with the apparatus information. However, the invention is not limited thereto but, for example, diagnosis image data may be generated by reading a diagnosis image from the test print paper with an image scanner, a digital camera or the like. The diagnosis image data may be loaded into a computer device, and the computer device may transmit diagnosis information to maintenance apparatus 3. The point is that diagnosis image data need only be generated by reading a diagnosis image from the test print paper with various electronic devices that can be used by the user, and transmitted to maintenance apparatus 3 as diagnosis information together with the apparatus information.

Furthermore, the invention is not limited to the embodiments and the other embodiments described above. That is, the application range of the invention covers embodiments obtained by arbitrarily combining some of or all of the embodiments described above and the other embodiments described above as well as embodiments obtained by extracting some of those embodiments.

Furthermore, in the first embodiment, the description is given of the case where maintenance system 1 as a maintenance system includes image formation apparatus 2 as an image formation apparatus, communication line 5 as a communication line, and maintenance apparatus 3 as a maintenance apparatus, the image formation apparatus includes information storage unit 21 as an information storage unit, print unit 14 as an image former, reader 15 as a reader, diagnosis information transmitter 22 as a diagnosis information transmitter, identification code receiver 23 as an identification code receiver, and identification code display unit 25 as a notification unit, and the maintenance apparatus includes diagnosis information receiver 45 as a diagnosis information receiver, identification code generator 41 as an identification code generator, database storage unit 42 and maintenance information database 31D as a diagnosis information storage unit, and identification code transmitter 46 as an identification code transmitter. However, the invention is not limited thereto but the maintenance system may include an image formation apparatus, a maintenance apparatus and a communication line, which have various other configurations, the image formation apparatus may include an information storage unit, an image former, a reader, a diagnosis information transmitter, an identification code receiver and a notification unit, which have various other configurations, and the maintenance apparatus may include a diagnosis information receiver, an identification code generator, a diagnosis information storage unit and an identification code transmitter, which have various other configurations.

Furthermore, in the first embodiment, the description is given of the case where the image formation apparatus includes the information storage unit, the image former, the reader, the diagnosis information transmitter, the identification code receiver and the notification unit. However, the invention is not limited thereto but the image formation apparatus may include an information storage unit, an image former, a reader, a diagnosis information transmitter, an identification code receiver and a notification unit, which have various other configurations.

INDUSTRIAL APPLICABILITY

The invention can also be used in a maintenance system for providing a maintenance service for an image formation apparatus configured as an MFP, for example.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:
1. A maintenance system comprising:
an image formation apparatus which forms an image on a medium;
a maintenance apparatus which manages information about maintenance of the image formation apparatus;
wherein
the image formation apparatus comprises:

a first controller that executes a first program that causes the first controller to perform operations comprising:
   causing an image former to form, on the medium, a diagnosis image for diagnosing a quality of an image formed,
   causing a reader to generate diagnosis image data corresponding to the diagnosis image by reading the medium on which the diagnosis image is formed, and
   causing a first communication unit to transmit the diagnosis image data to the maintenance apparatus,
the maintenance apparatus comprises:
a second controller that executes a second program that causes the second controller to perform operations comprising:
   causing a second communication unit to receive the diagnosis image data transmitted from the image formation apparatus,
   causing an identification code generator to generate an identification code for identifying the diagnosis image data,
   causing a storage unit to store the diagnosis image data and the identification code in association with each other, and
   causing the second communication unit to transmit the identification code to the image formation apparatus, and
the first program causes the first controller of the image formation apparatus to perform operations further comprising
   causing the first communication unit to receive the identification code from the maintenance apparatus, and
   causing a notification unit to provide a notification of the identification code.

2. The maintenance system according to claim 1, wherein
the image formation apparatus further comprises a received identification code storage unit; and
the program causes the first controller of the image formation apparatus to perform operations further comprising:
   causing the received identification code storage unit to store the identification code received by the first communication unit, and
   causing the notification unit to provide a notification of the previous identification code stored in the received identification code storage unit, in addition to a latest identification code received by the first communication unit.

3. The maintenance system according to claim 2, wherein
the program causes the first controller of the image formation apparatus to perform operations further comprising:
   causing the received identification code storage unit to store the identification code received by the first communication unit and reception date and time indicating at least one of the date and time of receipt of the identification code, in association with each other, and
   causing the notification unit to provide a notification of the previously received identification code together with the reception date and time.

4. The maintenance system according to claim 2, wherein
the notification unit comprises:
   a display unit caused by the first controller to provide a notification of information by displaying the information on a display screen, and
   an operation unit caused by the first controller to receive an operation input,
the program causes the first controller of the image formation apparatus to perform operations further comprising:
   causing the received identification code storage unit to store the identification code received by the first communication unit and the diagnosis image data in association with each other, and
   causing the notification unit to display the previously received identification code on the display unit and to display the diagnosis image data on the display unit according to the operation input received using the operation unit.

5. The maintenance system according to claim 1, wherein
the image formation apparatus further comprises an instruction receivers; and
the program causes the first controller of the image formation apparatus to perform operations further comprising causing the instruction receiver to receive an instruction operation input from an operation unit to form an identification code image representing the identification code by the image former on the medium.

6. The maintenance system according to claim 5, wherein
the notification unit comprises a touch panel including an integrated display panel and a touch sensor,
the program causes the first controller of the image formation apparatus to perform operations further comprising causing the notification unit to notify the identification code on a display screen displayed on the touch panel, and
the instruction receiver is displayed as an operation button on the display screen.

7. The maintenance system according to claim 1, wherein
the program causes the first controller to perform operations comprising causing an information storage unit configured to store connection information for connecting with the maintenance apparatus through the communication line and apparatus specification information for specifying the image formation apparatus.

8. The maintenance system according to claim 7, wherein
the program causes the first controller of the image formation apparatus to perform operations further comprising causing the first communication unit to function as a transmitter to transmit setting information indicating a setting value for the image formation in the image formation apparatus as the diagnosis information to the maintenance apparatus, in addition to the diagnosis image data and the apparatus specification information, and
the program causes the second controller of the maintenance apparatus to perform operations comprising causing the diagnosis information storage unit in the maintenance apparatus to store the diagnosis image data, the apparatus specification information, the setting information received as the diagnosis information, and the identification code in association with each other.

9. The maintenance system according to claim 7, wherein
the program causes the first controller of the image formation apparatus to perform operations further comprising causing the first communication unit to function as a transmitter to transmit state information indicating states of the information storage unit, the diagnosis information storage unit and the notification unit in the image formation apparatus, as the diagnosis information, to the maintenance apparatus in addition to the diagnosis image data and the apparatus specification information, and the program causes the second controller of the maintenance apparatus to perform operations comprising causing the diagnosis information storage unit in the maintenance apparatus to store the diagnosis image data, the apparatus specification information, the state information received as the diagnosis information, and the identification code in association with each other.

10. The maintenance system according to claim 7, wherein the program causes the first controller of the image formation apparatus to perform operations further comprising:

causing the information storage unit to store contact information indicating a contact for performing maintenance of the image formation apparatus, in addition to the connection information and the apparatus specification information, and causing the notification unit to display the contact for performing maintenance together with the identification code, based on the contact information stored in the information storage unit.

11. The maintenance system according to claim 1, wherein the program causes the first controller of the image formation apparatus to perform operations further comprising causing the reader to read the medium on which the diagnosis image is formed based on a newly obtained setting value.

12. The maintenance system according to claim 1 wherein the program causes second controller to perform operations such that causing the second communication unit to transmit the identification code to the image formation apparatus comprises causing the second communication unit to transmit the identification code without the diagnostic image data to the image formation apparatus.

13. An image formation apparatus which forms an image on a medium and communicates with a maintenance apparatus which manages information about maintenance, the image formation apparatus comprising:

a controller that executes a program that causes the controller to perform operations comprising:

causing an image former to form, on the medium, a diagnosis image for diagnosing the quality of an image formed;

causing a reader to generate diagnosis image data corresponding to the diagnosis image by reading the medium on which the diagnosis image is formed;

causing a communication unit to transmit the diagnosis image data to the maintenance apparatus;

causing the communication unit to receive an identification code, which is generated in association with the diagnosis image data in the maintenance apparatus, from the maintenance apparatus; and causing a notification unit to notify the user of the identification code.

14. The image formation apparatus according to claim 13, wherein the program causes the first controller of the image formation apparatus to perform operations further comprising causing the reader to read the medium on which the diagnosis image is formed based on a newly obtained setting value.

15. The image formation apparatus according to claim 13 wherein the program causes the controller to perform operations such that causing the communication unit to receive an identification code, which is generated in association with the diagnosis image data in the maintenance apparatus, from the maintenance apparatus comprises causing the communication unit to receive the identification code without the diagnostic image data, which is generated in association with the diagnosis image data in the maintenance apparatus, from the maintenance apparatus.

* * * * *